(12) United States Patent
Yoshioka et al.

(10) Patent No.: US 12,137,065 B2
(45) Date of Patent: Nov. 5, 2024

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 389 days.

(21) Appl. No.: 17/597,417

(22) PCT Filed: Jul. 8, 2019

(86) PCT No.: PCT/JP2019/027060
§ 371 (c)(1),
(2) Date: Jan. 5, 2022

(87) PCT Pub. No.: WO2021/005697
PCT Pub. Date: Jan. 14, 2021

(65) Prior Publication Data
US 2022/0286248 A1 Sep. 8, 2022

(51) Int. Cl.
*H04L 5/00* (2006.01)
(52) U.S. Cl.
CPC .......... *H04L 5/0048* (2013.01); *H04L 5/0016* (2013.01)
(58) Field of Classification Search
None
See application file for complete search history.

(56) References Cited

U.S. PATENT DOCUMENTS

| | | | |
|---|---|---|---|
| 11,129,001 B2* | 9/2021 | Brahmi | H04W 4/44 |
| 11,201,772 B2* | 12/2021 | Hwang | H04W 72/04 |
| 11,277,722 B2* | 3/2022 | Thein | H04W 4/44 |
| 11,317,415 B2* | 4/2022 | Khoryaev | H04W 72/51 |
| 11,323,301 B2* | 5/2022 | Han | H04L 5/0048 |
| 2018/0302889 A1* | 10/2018 | Guo | H04B 17/309 |
| 2020/0351136 A1* | 11/2020 | Hwang | H04L 27/26025 |
| 2021/0282165 A1* | 9/2021 | Lee | H04W 72/23 |

FOREIGN PATENT DOCUMENTS

WO 2018012614 A1 1/2018

OTHER PUBLICATIONS

3GPP TS 36.213 V14.3.0 "3rd Generation Partnership Project; Technical Specification Group Radio Access Network; Evolved Universal Terrestrial Radio Access (E-UTRA); Physical layer procedures (Release 14)" Jun. 2017 (462 pages).
International Search Report issued in International Application No. PCT/JP2019/027060, mailed Aug. 20, 2019 (5 pages).
Written Opinion issued in International Application No. PCT/JP2019/027060; Dated Aug. 20, 2019 (4 pages).
(Continued)

*Primary Examiner* — Eunsook Choi
(74) *Attorney, Agent, or Firm* — Osha Bergman Watanabe & Burton LLP

(57) ABSTRACT

A terminal is provided that includes a control unit configured to generate a sequence of a sidelink reference signal that corresponds to a sequence of a reference signal for demodulating a signal between a base station and a terminal; and a transmission unit configured to transmit the generated sidelink reference signal having the sequence to another terminal.

4 Claims, 14 Drawing Sheets

(56) References Cited

OTHER PUBLICATIONS

Office Action issued in the counterpart Japanese Patent Application No. 2021-530385, mailed on Apr. 11, 2023 (3 pages).
3GPP TS 38.211 V15.6.0; "3rd Generation Partnership Project; Technical Specification Group Radio Access Network; NR; Physical channels and modulation (Release 15)"; Jun. 2019, pp. 1 and 90 (2 pages).
Extended European Search Report issued in counterpart European Patent Application No. 19936740.0, mailed on Feb. 27, 2023 (11 pages).
Huawei, HiSilicon; "Sidelink reference signal design for NR V2X"; 3GPP TSG RAN WG1 Meeting #97, R1-1906009; Reno, USA; May 13-17, 2019 (11 pages).
NTT Docomo, Inc.; "NR Sidelink Physical Layer Structure"; 3GPP TSG RAN WG1 #97, R1-1906205; Reno, USA; May 13-17, 2019 (12 pages).
Ericsson; "PHY layer structure for NR sidelink"; 3GPP TSG-RAN WG1 Meeting #97, R1-1907134; Reno, Nevada, U.S.; May 13-17, 2019 (21 pages).
Office Action issued in counterpart Indian Patent Application No. 202117058020 mailed on Feb. 9, 2024 (7 pages).

\* cited by examiner

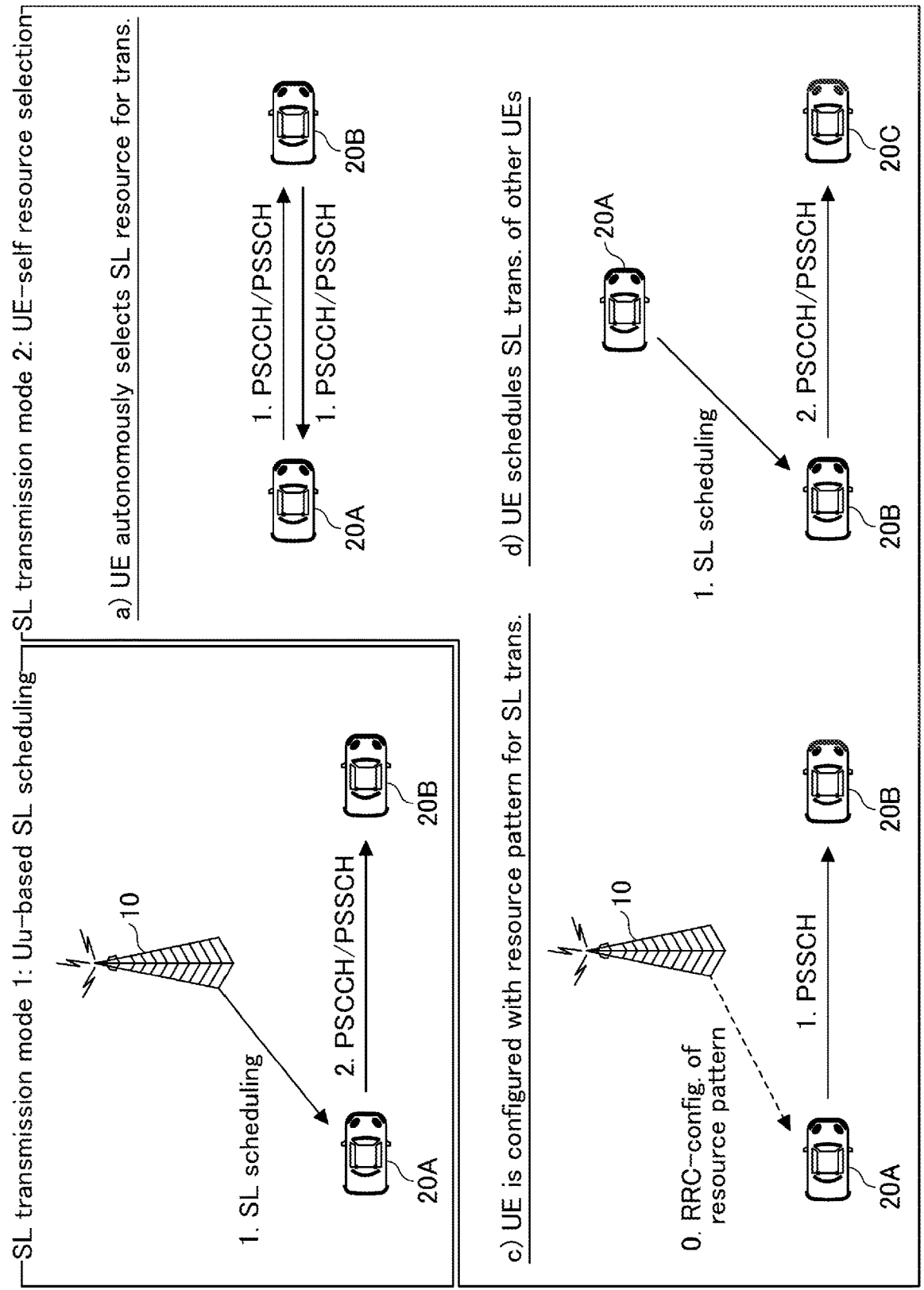

7.4.1.5.2    Sequence generation

The UE shall assume the reference-signal sequence $r(m)$ is defined by $$r(m) = \frac{1}{\sqrt{2}}(1 - 2 \cdot c(2m)) + j\frac{1}{\sqrt{2}}(1 - 2 \cdot c(2m+1))$$

where the pseudo-random sequence $c(i)$ is defined in clause 5.2.1. The pseudo-random sequence generator shall be initialised with $$c_{\text{init}} = \left(2^{10}\left(N_{\text{symb}}^{\text{slot}} n_{s,f}^{\mu} + l + 1\right)(2n_{\text{ID}} + 1) + n_{\text{ID}}\right) \bmod 2^{31}$$

at the start of each OFDM symbol where $n_{s,f}^{\mu}$ is the slot number within a radio frame, $l$ is the OFDM symbol number within a slot, and $n_{\text{ID}}$ equals the higher-layer parameter *scramblingID* or *sequenceGenerationConfig*.

7.4.1.5.3 Mapping to physical resources

For each CSI-RS configured, the UE shall assume the sequence being mapped to resources elements $(k,l)_{p,\mu}$ according to $$a_{k,l}^{(p,\mu)} = \beta_{\text{CSIRS}} w_f(k') \cdot w_l(l') \cdot r_{l,n_{s,f}}(m')$$

$$m' = \lfloor n\alpha \rfloor + k' + \left\lfloor \frac{\bar{k}\rho}{N_{sc}^{RB}} \right\rfloor$$

$$k = nN_{sc}^{RB} + \bar{k} + k'$$

$$l = \bar{l} + l'$$

$$\alpha = \begin{cases} \rho & \text{for } X = 1 \\ 2\rho & \text{for } X > 1 \end{cases}$$

$$n = 0,1,\ldots$$

Table 7.4.1.5.3-2: The sequences $w_f(k')$ and $w_t(l')$ for *cdm-Type* equal to 'no CDM'.

| Index | $w_f(0)$ | $w_t(0)$ |
|---|---|---|
| 0 | 1 | 1 |

Table 7.4.1.5.3-3: The sequences $w_f(k')$ and $w_t(l')$ for *cdm-Type* equal to 'FD-CDM2'.

| Index | [$w_f(0)$  $w_f(1)$] | $w_t(0)$ |
|---|---|---|
| 0 | [+1  +1] | 1 |
| 1 | [+1  −1] | 1 |

Table 7.4.1.5.3-1: CSI-RS locations within a slot.

| Row | Ports $X$ | Density $\rho$ | cdm-Type | $(\bar{k},\bar{l})$ | CDM group index $j$ | $k'$ | $l'$ |
|---|---|---|---|---|---|---|---|
| 1 | 1 | 3 | No CDM | $(k_0,l_0), (k_0+4,l_0), (k_0+8,l_0)$ | 0,0,0 | 0 | 0 |
| 2 | 1 | 1, 0.5 | No CDM | $(k_0,l_0)$ | 0 | 0 | 0 |
| 3 | 2 | 1, 0.5 | FD-CDM2 | $(k_0,l_0)$ | 0 | 0, 1 | 0 |
| 4 | 4 | 1 | FD-CDM2 | $(k_0,l_0), (k_0+2,l_0)$ | 0,1 | 0, 1 | 0 |
| 5 | 4 | 1 | FD-CDM2 | $(k_0,l_0), (k_0,l_0+1)$ | 0,1 | 0, 1 | 0 |
| 6 | 8 | 1 | FD-CDM2 | $(k_0,l_0), (k_1,l_0), (k_2,l_0), (k_3,l_0)$ | 0,1,2,3 | 0, 1 | 0 |
| 7 | 8 | 1 | FD-CDM2 | $(k_0,l_0), (k_1,l_0), (k_0,l_0+1), (k_1,l_0+1)$ | 0,1,2,3 | 0, 1 | 0 |
| 8 | 8 | 1 | CDM4 (FD2,TD2) | $(k_0,l_0), (k_1,l_0)$ | 0,1 | 0, 1 | 0, 1 |
| 9 | 12 | 1 | FD-CDM2 | $(k_0,l_0), (k_1,l_0), (k_2,l_0), (k_3,l_0), (k_4,l_0), (k_5,l_0)$ | 0,1,2,3,4,5 | 0, 1 | 0 |
| 10 | 12 | 1 | CDM4 (FD2,TD2) | $(k_0,l_0), (k_1,l_0), (k_2,l_0)$ | 0,1,2 | 0, 1 | 0, 1 |
| 11 | 16 | 1, 0.5 | FD-CDM2 | $(k_0,l_0), (k_1,l_0), (k_2,l_0), (k_3,l_0), (k_0,l_0+1), (k_1,l_0+1), (k_2,l_0+1), (k_3,l_0+1)$ | 0,1,2,3, 4,5,6,7 | 0, 1 | 0 |
| 12 | 16 | 1, 0.5 | CDM4 (FD2,TD2) | $(k_0,l_0), (k_1,l_0), (k_2,l_0), (k_3,l_0)$ | 0,1,2,3 | 0, 1 | 0, 1 |
| 13 | 24 | 1, 0.5 | FD-CDM2 | $(k_0,l_0), (k_1,l_0), (k_2,l_0), (k_0,l_0+1), (k_1,l_0+1), (k_2,l_0+1), (k_0,l_1), (k_1,l_1), (k_2,l_1), (k_0,l_1+1), (k_1,l_1+1), (k_2,l_1+1)$ | 0,1,2,3,4,5, 6,7,8,9,10,11 | 0, 1 | 0 |
| 14 | 24 | 1, 0.5 | CDM4 (FD2,TD2) | $(k_0,l_0), (k_1,l_0), (k_2,l_0), (k_0,l_1), (k_1,l_1), (k_2,l_1)$ | 0,1,2,3,4,5 | 0, 1 | 0, 1 |
| 15 | 24 | 1, 0.5 | CDM8 (FD2,TD4) | $(k_0,l_0), (k_1,l_0), (k_2,l_0)$ | 0,1,2 | 0, 1 | 0, 1, 2, 3 |
| 16 | 32 | 1, 0.5 | FD-CDM2 | $(k_0,l_0), (k_1,l_0), (k_2,l_0), (k_3,l_0), (k_0,l_0+1), (k_1,l_0+1), (k_2,l_0+1), (k_3,l_0+1), (k_0,l_1), (k_1,l_1), (k_2,l_1), (k_3,l_1), (k_0,l_1+1), (k_1,l_1+1), (k_2,l_1+1), (k_3,l_1+1)$ | 0,1,2,3, 4,5,6,7, 8,9,10,11, 12,13,14,15 | 0, 1 | 0 |
| 17 | 32 | 1, 0.5 | CDM4 (FD2,TD2) | $(k_0,l_0), (k_1,l_0), (k_2,l_0), (k_3,l_0), (k_0,l_1), (k_1,l_1), (k_2,l_1), (k_3,l_1)$ | 0,1,2,3,4,5,6,7 | 0, 1 | 0, 1 |
| 18 | 32 | 1, 0.5 | CDM8 (FD2,TD4) | $(k_0,l_0), (k_1,l_0), (k_2,l_0), (k_3,l_0)$ | 0,1,2,3 | 0,1 | 0, 1, 2, 3 |

FIG.6

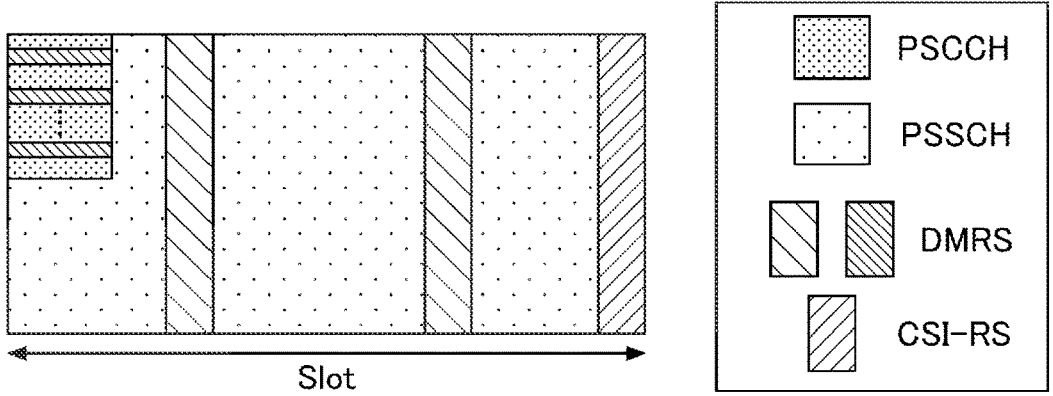

PSCCH
PSSCH
DMRS
CSI-RS

Slot

7.4.1.3 Demodulation reference signals for PDCCH

7.4.1.3.1 Sequence generation

The UE shall assume the reference-signal sequence $r_l(m)$ for OFDM symbol $l$ is defined by $$r_l(m) = \frac{1}{\sqrt{2}}(1 - 2 \cdot c(2m)) + j\frac{1}{\sqrt{2}}(1 - 2 \cdot c(2m+1)).$$

where the pseudo-random sequence $c(i)$ is defined in clause 5.2.1. The pseudo-random sequence generator shall be initialized with $$c_{init} = \left(2^{17}(N_{symb}^{slot} n_{s,f}^{\mu} + l + 1)(2N_{ID} + 1) + 2N_{ID}\right) \bmod 2^{31}$$

where $l$ is the OFDM symbol number within the slot, $n_{s,f}^{\mu}$ is the slot number within a frame, and

- $N_{ID} \in \{0,1,...,65535\}$ is given by the higher-layer parameter *pdcch-DMRS-ScramblingID* if provided
- $N_{ID} = N_{ID}^{cell}$ otherwise.

7.4.1.3.2    Mapping to physical resources

The UE shall assume the sequence $r_l(m)$ is mapped to resource elements $(k,l)_{p,\mu}$ according to $$a_{k,l}^{(p,\mu)} = \beta_{DMRS}^{PDCCH} \cdot r_l(3n+k')$$

7.4.1.1 Sequence generation

The UE shall assume the sequence $r(n)$ is defined by $$r(n) = \frac{1}{\sqrt{2}}(1-2\cdot c(2n)) + j\frac{1}{\sqrt{2}}(1-2\cdot c(2n+1)).$$

where the pseudo-random sequence $c(i)$ is defined in clause 5.2.1. The pseudo-random sequence generator shall be initialized with $$c_{init} = \left(2^{17}\left(N_{symb}^{slot} n_{s,f}^{\mu} + l + 1\right)\left(2N_{ID}^{n_{SCID}} + 1\right) + 2N_{ID}^{n_{SCID}} + n_{SCID}\right)\bmod 2^{31}$$

where $l$ is the OFDM symbol number within the slot, $n_{s,f}^{\mu}$ is the slot number within a frame, and

- $N_{ID}^{0}, N_{ID}^{1} \in \{0,1,...,65535\}$ are given by the higher-layer parameters *scramblingID0* and *scramblingID1*, respectively, in the *DMRS-DownlinkConfig* IE if provided and the PDSCH is scheduled by PDCCH using DCI format 1_1 with the CRC scrambled by C-RNTI, MCS-C-RNTI, or CS-RNTI

- $N_{ID}^{0} \in \{0,1,...,65535\}$ is given by the higher-layer parameter *scramblingID0* in the *DMRS-DownlinkConfig* IE if provided and the PDSCH is scheduled by PDCCH using DCI format 1_0 with the CRC scrambled by C-RNTI, MCS-C-RNTI, or CS-RNTI;

- $N_{ID}^{n_{SCID}} = N_{ID}^{cell}$ otherwise;

The quantity $n_{SCID} \in \{0, 1\}$ is given by the DM-RS sequence initialization field, in the DCI associated with the PDSCH transmission if DCI format 1_1 in [4, TS 38.212] is used, otherwise $n_{SCID} = 0$.

7.4.1.1.2   Mapping to physical resources

The UE shall assume the PDSCH DM-RS being mapped to physical resources according to configuration type 1 or configuration type 2 as given by the higher-layer parameter *dmrs-Type*.

The UE shall assume the sequence $r(m)$ is scaled by a factor $\beta_{PDSCH}^{DMRS}$ to conform with the transmission power specified in [6, TS 38.214] and mapped to resource elements $(k,l)_{p,\mu}$ according to $$a_{k,l}^{(p,\mu)} = \beta_{PDSCH}^{DMRS} w_f(k')w_t(l')r(2n+k')$$

$$k = \begin{cases} 4n+2k'+\Delta & \text{Configuration type 1} \\ 6n+k'+\Delta & \text{Configuration type 2} \end{cases}$$

$$k' = 0,1$$

$$l = \bar{l}+l'$$

$$n = 0,1,\ldots$$

Table 7.4.1.1.2-1: Parameters for PDSCH DM-RS configuration type 1.

| $p$ | CDM group $\lambda$ | $\Delta$ | $w_f(k')$ | | $w_t(l')$ | |
|---|---|---|---|---|---|---|
| | | | $k'=0$ | $k'=1$ | $l'=0$ | $l'=1$ |
| 1000 | 0 | 0 | +1 | +1 | +1 | +1 |
| 1001 | 0 | 0 | +1 | -1 | +1 | +1 |
| 1002 | 1 | 1 | +1 | +1 | +1 | +1 |
| 1003 | 1 | 1 | +1 | -1 | +1 | +1 |
| 1004 | 0 | 0 | +1 | +1 | +1 | -1 |
| 1005 | 0 | 0 | +1 | -1 | +1 | -1 |
| 1006 | 1 | 1 | +1 | +1 | +1 | -1 |
| 1007 | 1 | 1 | +1 | -1 | +1 | -1 |

Table 7.4.1.1.2-2: Parameters for PDSCH DM-RS configuration type 2.

| $p$ | CDM group $\lambda$ | $\Delta$ | $w_f(k')$ | | $w_t(l')$ | |
|---|---|---|---|---|---|---|
| | | | $k'=0$ | $k'=1$ | $l'=0$ | $l'=1$ |
| 1000 | 0 | 0 | +1 | +1 | +1 | +1 |
| 1001 | 0 | 0 | +1 | -1 | +1 | +1 |
| 1002 | 1 | 2 | +1 | +1 | +1 | +1 |
| 1003 | 1 | 2 | +1 | -1 | +1 | +1 |
| 1004 | 2 | 4 | +1 | +1 | +1 | +1 |
| 1005 | 2 | 4 | +1 | -1 | +1 | +1 |
| 1006 | 0 | 0 | +1 | +1 | +1 | -1 |
| 1007 | 0 | 0 | +1 | -1 | +1 | -1 |
| 1008 | 1 | 2 | +1 | +1 | +1 | -1 |
| 1009 | 1 | 2 | +1 | -1 | +1 | -1 |
| 1010 | 2 | 4 | +1 | +1 | +1 | -1 |
| 1011 | 2 | 4 | +1 | -1 | +1 | -1 |

TERMINAL AND COMMUNICATION METHOD

TECHNICAL FIELD

The present invention relates to a terminal (user apparatus) and a communication method in a radio communication system.

BACKGROUND ART

In LTE (Long Term Evolution) and succeeding systems of LTE (e.g., LTE-A (LTE-Advanced), NR (New Radio) (also referred to as 5G)), sidelink (SL) (also referred to as Device to Device (D2D)) technology has been discussed for executing direct communication between communication apparatuses such as UEs without an intervening base station gNB (see, for example, Non-patent document 1).

RELATED ART DOCUMENT

Non-Patent Document

NON-PATENT DOCUMENT 1: 3GPP TS 36.213 V14.3.0(2017-06)

SUMMARY OF THE INVENTION

Problem to be Solved by the Invention

Channels for direct communication between terminals used in direct communication between terminals (sidelink technology) include the following channels.

A channel to transmit control information such as SCI (Sidelink Control Information) is referred to as a PSCCH (Physical Sidelink Control Channel), and a channel to transmit data is referred to as a PSSCH (Physical Sidelink Shared Channel). Also, V2X (Vehicle to Everything) of NR specifies support of HARQ (Hybrid Automatic Repeat Request) operations for the PSCCH and PSCCH, and defines feedback control information on direct communication between terminals (Sidelink Feedback Control Information (SFCI)) including HARQ-ACK. The SFCI is transmitted via a feedback channel for direct communication between terminals (Physical Sidelink Feedback Channel (PSFCH)).

In the sidelink of NR (NR-SL), transmission of DM-RS (Demodulation Reference Signal(s)) and CSI-RS (Channel State Information Reference Signal(s)) has been discussed. The DM-RS is, for example, a reference signal used for demodulating a PSCCH, PSSCH, or PSBCH (Physical Sidelink Broadcast Channel). The DM-RS may be used for demodulating a PSFCH. The CSI-RS is, for example, a reference signal used for reporting channel state information, RLM (Radio Link Monitoring), and/or RLF (Radio Link Failure).

However, the sequence, mapping, configuration/indication, and the like of reference signals in NR-SL are not clearly specified.

The present invention has been made in view of the above-described points, and has an object to provide a technology that specifies reference signals in the sidelink of NR (NR-SL). Note that the present invention is not limited to communication between terminals in V2X, and may be applied to any terminal.

Means for Solving the Problem

According to the disclosed technology, a terminal is provided that includes a control unit configured to generate a sequence that corresponds to a sequence of a reference signal for demodulating a signal between a base station and a terminal, and a transmission unit configured to transmit the generated sidelink reference signal having the sequence to another terminal.

Effect of the Present Invention

According to the disclosed technologies, a technology is provided that specifies reference signals in the sidelink of NR (NR-SL).

BRIEF DESCRIPTION OF THE DRAWINGS

FIG. 1 is a diagram illustrating four types of sidelink transmission modes in NR-V2X;

FIG. 2 is a diagram illustrating generation of a sequence of CSI-RS;

FIG. 3 is a diagram illustrating a mapping of a sequence of CSI-RS;

FIG. 4 is a table illustrating a sequence of CSI-RS;

FIG. 5 is a table illustrating CSI-RS locations in a slot;

FIG. 6 is a diagram illustrating an example of a slot including PSCCH, PSSCH, DM-RS, and CSI-RS;

FIG. 11 is a diagram illustrating generation of a sequence of DM-RS for PDCCH;

FIG. 12 is a diagram illustrating a mapping of a sequence of DM-RS for PDCCH;

FIG. 13 is a diagram illustrating generation of a sequence of DM-RS for PDSCH;

FIG. 14 is a diagram illustrating a mapping of a sequence of DM-RS for PDSCH;

FIG. 15 is a table illustrating parameters for configuring DM-RS for PDSCH;

EMBODIMENTS FOR CARRYING OUT THE INVENTION

Figure 7:
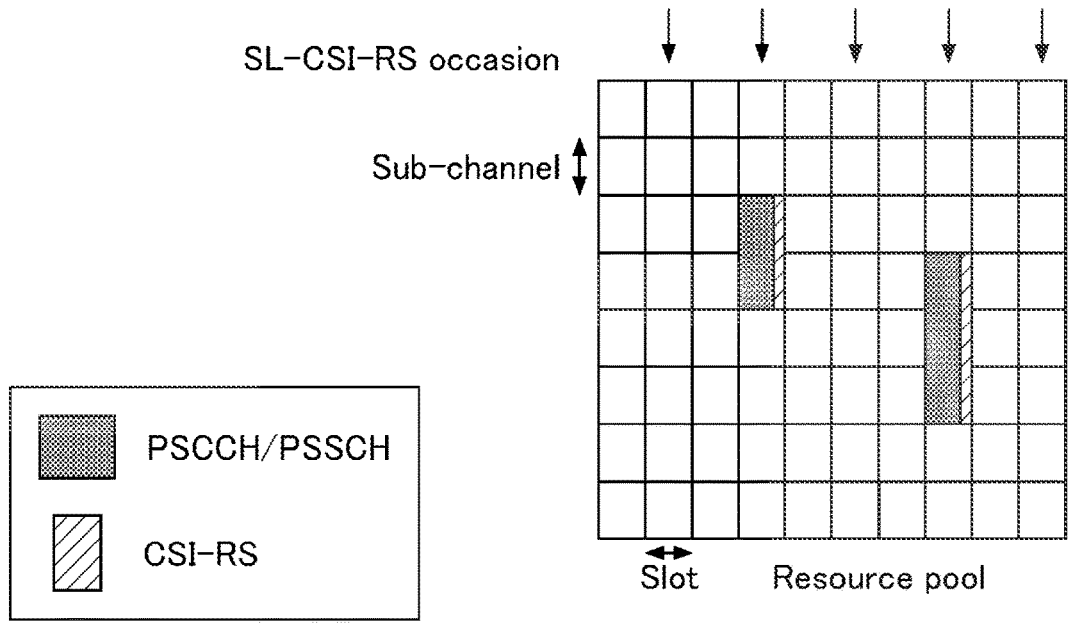
FIG. 7 is a diagram illustrating an example of a configuration of sidelink CSI-RS.

In the following, embodiments of the present invention (present embodiments) will be described with reference to the drawings. Note that an embodiment described below merely presents an example, and an embodiment to which the present invention is applied is not limited to the following embodiments.

(Sidelink Transmission Mode)

Sidelink transmission modes in NR-V2X will be described.

FIG. 1 is a diagram illustrating four types of sidelink transmission modes in NR-V2X. Note that a transmission mode may be referred to as a resource allocation mode, and is not limited as such.

In a sidelink transmission mode 1 of NR-V2X, a user apparatus 20A transmits a PSCCH/PSSCH to a user apparatus 20B based on SL scheduling determined by a base station apparatus 10.

In a sidelink transmission mode 2 of NR-V2X, transmission of a PSCCH/PSSCH is performed based on resource selection determined by a user apparatus itself. The sidelink transmission mode 2 of NR-V2X is further subdivided; in a sidelink transmission mode 2-a of NR-V2X, the user apparatus 20A transmits a PSCCH/PSSCH to the user apparatus 20B based on the resource selection determined by the user apparatus 20A itself, and the user apparatus 20B transmits a PSCCH/PSSCH to the user apparatus A based on the resource selection determined by the user apparatus 20B itself. In a sidelink transmission mode 2-c of NR-V2X, according to a resource pattern indicated from the base station apparatus 10, defined by the definitions, or configured in advance, the user apparatus 20A transmits a PSSCH to the user apparatus 20B.

In a sidelink transmission mode 2-d of NR-V2X, the user apparatus 20A transmits SL scheduling to the user apparatus 20B, to perform scheduling for transmission to be performed by the user apparatus 20B, and the user apparatus 20B transmits a PSCCH/PSSCH to the user apparatus 20A based on the scheduling.

(SL-CSI-RS)

As an embodiment according to the present invention, for CSI-RS (hereafter, also referred to as SL-CSI-RS) in a sidelink, it is possible to consider a sequence of SL-CSI-RS to be as a sequence corresponding to a sequence of CSI-RS between a base station and a terminal (Uu CSI-RS). In other words, it is possible to consider applying definitions similar to the definitions for a sequence of CSI-RS between a base station and a terminal (Uu CSI-RS) as the definitions for a sequence of SL-CSI-RS. Note that the SL-CSI-RS may be referred to as, for example, SRS (Sounding Reference Signal) or SRS in a sidelink (SL-SRS), or may be another signal used for similar purposes. FIG. 2 is a diagram illustrating generation of a sequence of CSI-RS between a base station and a terminal (Uu CSI-RS). As illustrated in FIG. 2, an expression of a sequence r(m) of reference signals CSI-RS includes a pseudo-random sequence c(i) and generation of the pseudo-random sequence is initialized with $c_{init}$. The expression of $c_{init}$ includes $n_{ID}$, $n^\mu_{s,f}$, and l. Here, $n_{ID}$ corresponds to scramblingID or sequenceGenerationConfig as a higher-layer parameter; $n^\mu_{s,f}$ corresponds to a slot number in a radio frame; and l corresponds to an OFDM symbol number in a slot. When applying the definitions for a sequence of CSI-RS between a base station and a terminal as the definitions for a sequence of SL-CSI-RS, the following changes or updates may be applied.

($n_{ID}$)
(1) The value of $n_{ID}$ included in the expression to generate a sequence of SL-CSI-RS may be defined as a definition in the technical specification. For example, $n_{ID}$ may be one of the values in {0, 1, . . . , 1023}. Alternatively, the value of $n_{ID}$ may vary depending on the cast type (e.g., broadcast/group cast/unicast).
(2) The value of $n_{ID}$ may be determined depending on the ID of a transmission-side user apparatus (TX-UE) or the ID of a reception-side user apparatus (RX-UE) (e.g., $n_{ID}$=TX-UE ID mod $2^{10}$). The ID of a TX-UE may be referred to as a Source ID, Group ID, or Group Source ID, and the ID of an RX-UE may be referred to as a Destination ID, Group ID, or Group Destination ID.
(3) The value of $n_{ID}$ may be configured (in advance). For example, one of the values in {0, 1, . . . , 1023} may be configured by a parameter different from a parameter for downlink CSI-RS.
(4) The value of $n_{ID}$ may be provided as a parameter to be transmitted and received between user apparatuses. For example, it may be provided as a parameter in a PC5-RRC message. Note that the parameter of PC5-RRC may mean a higher-layer parameter to be transmitted and received between UEs in a higher-layer connection (e.g., RRC connection) established between the UEs.
(5) The value of $n_{ID}$ may be determined by combining (1), (2), (3), and (4) described above. For example, the above-described (1) may be applied before a PC5-RRC connection setup, and the above-described (4) may be applied after the PC5-RRC connection setup. Alternatively, multiple values in (1) (2) (3) (4) described above may be combined to be used as a single value. Note that the PC5-RRC connection setup may mean a higher-layer connection established between the UEs. A higher-layer connection established between the UEs may be established for Unicast communication or Groupcast communication.

($n^\mu_{s,f}$)
(i) The value of $n^\mu_{s,f}$ included in the expression to generate a sequence of SL-CSI-RS may be a slot number in a (radio) frame of a sidelink.
(ii) The value of $n^\mu_{s,f}$ may be a slot number in a subframe of the sidelink.
(iii) The value of $n^\mu_{s,f}$ may be a slot number in a Uu (radio) frame or subframe (i.e., in a (radio) frame or subframe between the user apparatus and the base station) (see Uu-based SL scheduling in FIG. 1).
(iv) The value of $n^\mu_{s,f}$ may be determined based on an SFN (System frame number) and/or frame number (e.g., DFN (direct frame number)) used in the sidelink.
(v) The value of $n^\mu_{s,f}$ may be determined by combining (i) (ii) (iii) (iv) described above. For example, in the case of a carrier in which only an unlicensed spectrum or SL is configured, the above-described (i) may be applied, and in the case of a carrier in which a licensed spectrum or Uu and SL are mixed, the above (iii) may be applied. Note that frames and subframes may be constituted with not only existing frames and subframes, but also time resources other than the existing frames and subframes.

($c_{init}$)

The range of values of $n_{ID}$ included in the expression to generate a sequence of SL-CSI-RS can be broadened or narrowed (e.g., {0, 1, . . . , 65535}). In this case, instead of the expression in FIG. 2, an expression of $c_{init}$ can be defined as, for example, the following expression.

$$C_{init}=(2^{16}(N_{symb}^{slot}n_{s,f}^\mu+l+1)(2n_{ID}+1)+n_{ID}) \bmod 2^{31} \quad \text{[Formula 1]}$$

In this way, by applying the definitions for a sequence of CSI-RS between a base station and a terminal as the definitions for a sequence of SL-CSI-RS, it is possible to reduce the complexity of implementation of a user apparatus.

(CSI-RS Port and Mapping)

FIG. 3 is a diagram illustrating a mapping of a sequence of NR-Uu CSI-RS; FIG. 4 is a table illustrating a sequence of NR-Uu CSI-RS; and FIG. 5 is a table illustrating locations of CSI-RS in an NR-Uu slot.

For the number of CSI-RS ports in NR-SL, it is possible to consider setting the maximum number of CSI-RS ports to two or to the maximum number of layers.

Some of the line numbers 1 to 18 in FIG. 5 may be applied to NR-SL. In the case of the maximum number of CSI-RS ports being 2, for example, the line numbers (rows) 1, 2, and 3 in FIG. 5 may be applied to NR-SL. Alternatively, line numbers other than 1 to 18 may be added to be applied to NR-SL.

Alternatively, the line numbers 1, 2, and 3; and/or a new configuration may be applied to NR-SL.

For example, the new configuration may be specified with the number of ports (Ports) X=2; Density p=1 or 0.5; cdm-Type=No CDM; CDM group index j=0;

$$(\bar{k},\bar{l})=(k_0,l_0)$$ [Formula 2]

$(k_0+1, l_0)$; k'=0; and l'=0.

(Time-Domain Resources)
  (1) Time-domain resources for SL-CSI-RS may be fixed to the last symbol of a PSSCH. For example, it is possible to set the parameter firstOFDMsymbolInTimeDomain, $l_0$=13, and it may be fixed to the last symbol available as a PSSCH. The parameter firstOFDMsymbolInTimeDomain2, $l_1$ may not be specified.
  (2) The time-domain resources of SL-CSI-RS may be configured (in advance).
  (3) The time-domain resources of SL-CSI-RS may be indicated by SCI (Sidelink Control Information) and/or DCI (Downlink Control Information). For example, in the case of the sidelink transmission mode 1, SL-CSI-RS resources may be indicated by DCI transmitted from the base station apparatus 10, and further, the positions and the like in the resources indicated by the DCI, may be indicated by SCI transmitted from the user apparatus 20.
  (4) The time-domain resources of SL-CSI-RS may be determined based on a DM-RS configuration (e.g., the positions of DM-RS in the time domain).
  (5) The time-domain resources of SL-CSI-RS may be provided as a parameter of PC5-RRC. Note that the time-domain resources of SL-CSI-RS may be explicitly designated or implicitly designated. Also, the time-domain resources of SL-CSI-RS may be determined by combining (1), (2), (3), (4), and (5) described above.

(1), (2), (3), (4), and (5) described above may be applied to the following parameters:

Parameters frequencyDomainAllocation, $k_0$, $k_1$, $k_2$, and $k_3$
Parameter cdm-Type
Parameter nrofPorts
Parameter Density In other words, for example, the frequency-domain resources of SL-CSI-RS may be determined based on any of the following.
  (1) The frequency-domain resources of SL-CSI-RS may be fixed to a specific subcarrier of a PSSCH. For example, it is possible to set the parameter frequencyDomainAllocation, $k_0$=0. Also, these may be configured for every single row or for multiple rows.
  (2) The frequency-domain resources of SL-CSI-RS may be configured (in advance).
  (3) The frequency-domain resources of SL-CSI-RS may be indicated by SCI (Sidelink Control Information) and/or DCI (Downlink Control Information).
  (4) The frequency-domain resources of SL-CSI-RS may be determined based on a DM-RS configuration (e.g., the positions of DM-RS).
  (5) The frequency-domain resources of SL-CSI-RS may be provided as a parameter of PC5-RRC. Note that the frequency-domain resources of SL-CSI-RS may be explicitly designated or implicitly designated. Also, the frequency-domain resources of the SL-CSI-RS may be determined by combining (1) (2) (3) (4) (5) described above.

(Reference Point for k)
  (1) The reference point or control point for the parameter k illustrated in FIG. 3 may be a specific subcarrier in the resource pool (e.g., subcarrier 0 in the resource pool).
  (2) The reference point or control point for the parameter k may be a specific subcarrier in a subchannel (e.g., subcarrier 0 (subcarrier 0 in the subchannel)).
  (3) The reference point or control point for the parameter k may be a specific subcarrier of the lowest-numbered resource block in actually-utilized resource blocks for a PSCCH (e.g., subcarrier 0 of the lowest-numbered RB in actually-utilized RB for the PSCCH).
  (4) The reference point or control point for the parameter k may be a specific subcarrier in the common resource block 0 for the sidelink (e.g., subcarrier 0 in the common resource block 0 for SL).

(Configuration of SL-CSI-RS)

FIG. 6 is a diagram illustrating an example of a slot including PSCCH, PSSCH, DM-RS, and CSI-RS.

Figure 8:
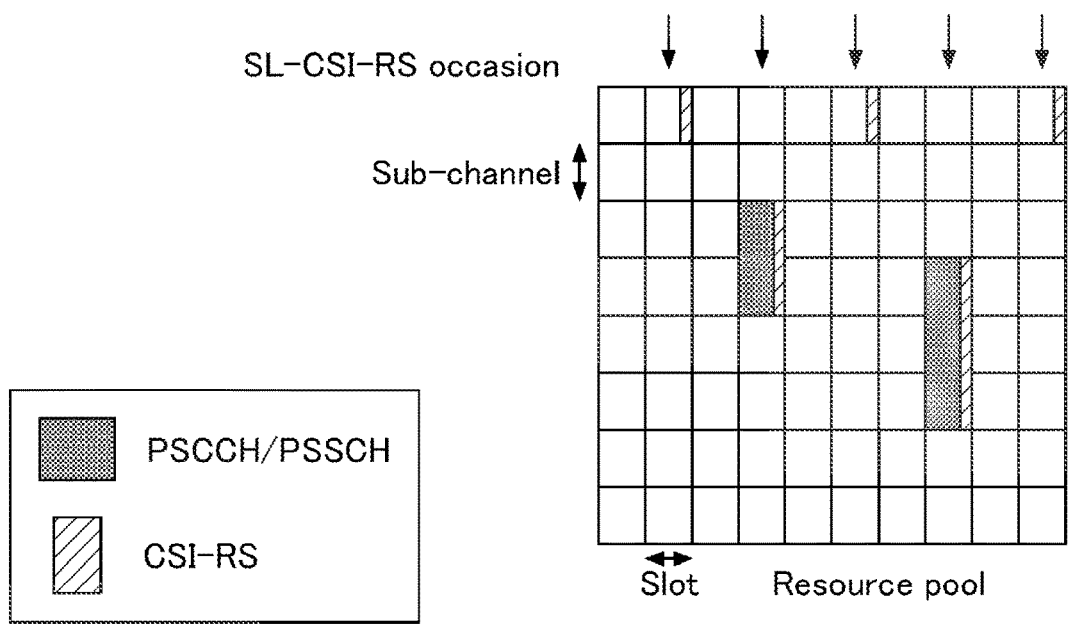
FIG. 8 is a diagram illustrating an example of a configuration of sidelink CSI-RS.

FIGS. 7 and 8 are diagrams illustrating examples of a periodic and/or semi-persistent SL-CSI-RS configuration. In FIGS. 7 and 8, a downward pointing arrow indicates an SL-CSI-RS occasion.

A periodic and/or semi-persistent SL-CSI-RS may be configured by a PC5-RRC configuration. Note that the PC5-RRC configuration may mean a configuration shared between UEs in a higher-layer connection established between the UEs.

When configuring a periodic and/or semi-persistent SL-CSI-RS, the SL-CSI-RS configuration in a slot and the period/offset may be configured.
  (1) When configuring/designating a periodic and/or semi-persistent SL-CSI-RS, it is possible to not provide resources in the frequency domain at the resource block level (subchannel level). For example, as illustrated in FIG. 7, in the case where a periodic SL-CSI-RS is transmitted to the user apparatus 20 on a slot based on the periodicity/offset, if a PSCCH/PSSCH is transmitted on the slot, an SL-CSI-RS may be transmitted in the same subchannel as the PSCCH/PSSCH on the slot; or if no PSCCH/PSSCH is transmitted on the slot, no SL-CSI-RS may be transmitted (in any subchannel). Such a configuration enables the avoidance of wastefully transmitting only the SL-CSI-RS on the slot.
  (2) When configuring/designating a periodic and/or semi-persistent SL-CSI-RS, resources in the frequency domain at the resource block level (subchannel level) may be provided. For example, as illustrated in FIG. 8, in the case where a periodic SL-CSI-RS is transmitted to the user apparatus 20 on a slot based on the periodicity/offset, if a PSCCH/PSSCH is transmitted on the slot, an SL-CSI-RS is transmitted in the same subchannel as the PSCCH/PSSCH on the slot; or if no PSCCH/PSSCH is transmitted on the slot, an SL-CSI-RS may be transmitted over the configured resources in the frequency domain. Such a configuration enables the periodic transmission of the SL-CSI-RS resulting in better CSI. This also enables the avoidance of discontinuous signal transmission in the frequency direction, and thereby reduces the interference with PSCCH/PSSCH transmission. Note that in the case where a periodic SL-CSI-RS is transmitted to the user apparatus

20 on a slot based on the periodicity/offset, if a PSCCH/PSSCH is transmitted on the slot, the SL-CSI-RS may be transmitted over the configured resources in the frequency domain.

As an SL-CSI-RS configuration, aperiodic SL-CSI-RS may be indicated by SCI. Alternatively, the aperiodic SL-CSI-RS may be indicated by a combination of SCI and DCI.

(i) For example, by using one bit in the SCI, the presence or the absence of SL-CSI-RS in a scheduled PSSCH may be indicated.

(ii) Alternatively, by using multiple bits in the SCI, the presence or the absence of SL-CSI-RS in a scheduled PSSCH and/or the SL-CSI-RS configuration to be transmitted may be indicated.

Note that it is possible to specify that an aperiodic SL-CSI-RS (A-SL-CSI-RS) is always mapped onto a PSSCH by the same SCI that schedules the PSSCH.

Figure 9:
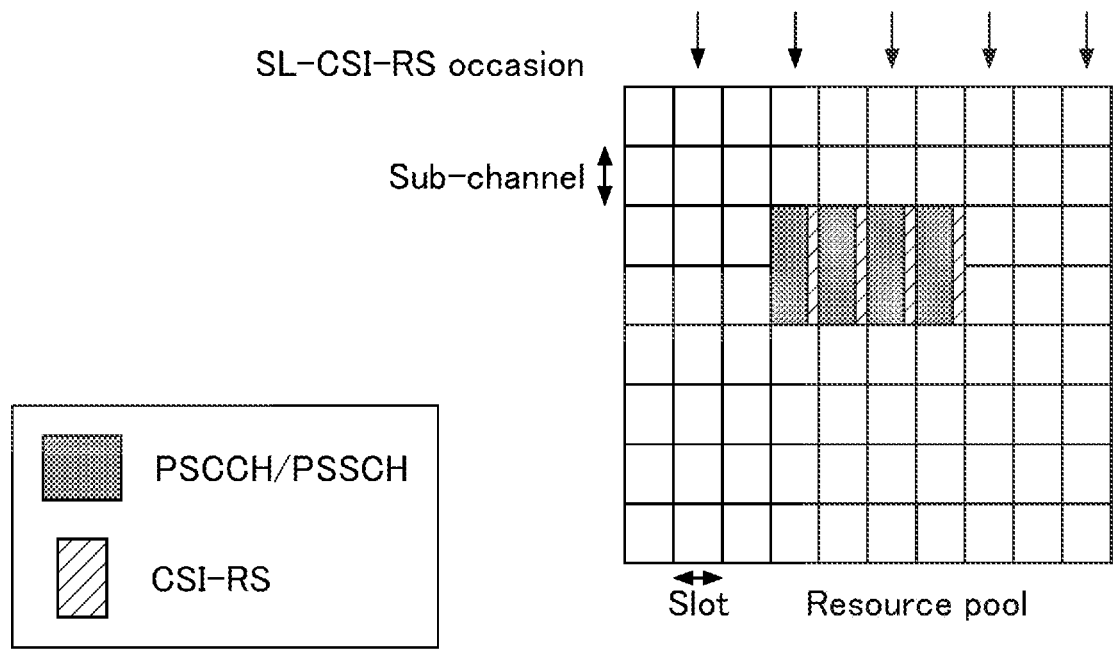
FIG. 9 is a diagram illustrating an example of a configuration of sidelink CSI-RS.

As illustrated in FIG. 9, in the case where a PSSCH (a certain transport block) extends over slot boundaries (in the case of slot aggregation), or, alternatively, in the case where transmission of a PSSCH extending over multiple slots (transmission of a certain transport block) is indicated by the SCI (in the case of repetition), SL-CSI-RS may be configured as follows:

(a) The SL-CSI-RS may be mapped only onto a specific slot(s) (e.g., the first slot, the last slot, or slot(s) of the SL-CSI-RS occasions (SL-CSI-RS occasion slot(s))) in a PSSCH on multiple slots.

(b) The SL-CSI-RS may be mapped onto all slots of a PSSCH extending over multiple slots. The configuration (e.g., sequence, mapping sources, and the like) of the SL-CSI-RS mapped onto each slot may all be the same, or may vary from slot to slot. For example, the configuration may be based on a slot index (slot index).

Applying the SL-CSI-RS configuration described above enables the operations of transmitting and receiving the SL-CSI-RS in the case where a PSSCH extends over multiple slots, to be clarified.

(PSCCH DM-RS)

As an embodiment according to the present invention, for DM-RS transmitted by a PSCCH (hereafter, referred to as "PSCCH DM-RS"), it is possible to consider a sequence of PSCCH DM-RS to be as a sequence corresponding to the sequence of PDCH DM-RS. In other words, it is possible to consider applying definitions similar to the definitions for a sequence of PDCH DM-RS as the definitions for a sequence of PSCCH DM-RS.

Figure 10:
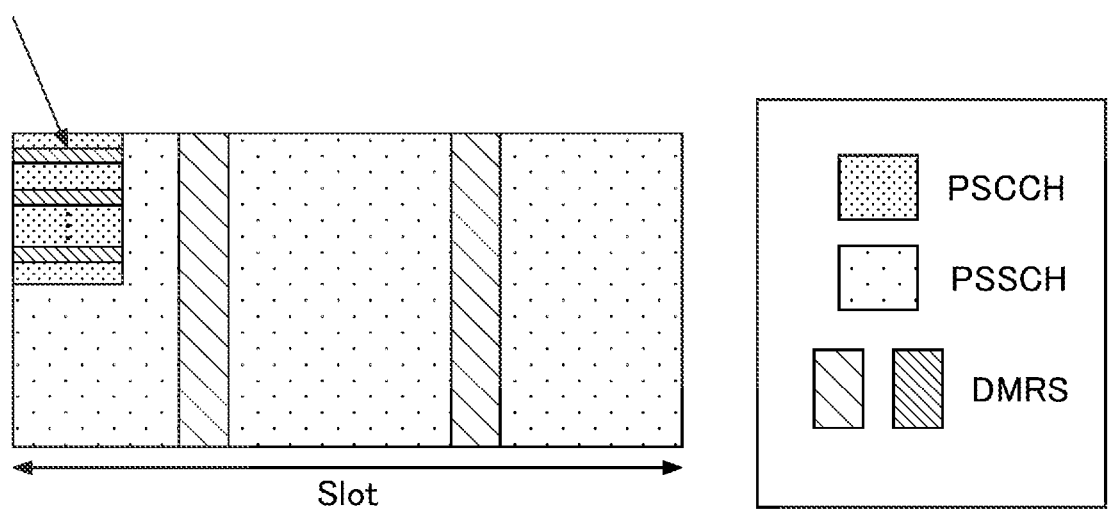
FIG. 10 is a diagram illustrating an example of a slot including PSCCH, PSSCH, and DM-RS.

FIG. 10 is a diagram illustrating an example of a slot including PSCCH, PSSCH, and DM-RS. For example, in FIG. 10, a PSCCH DM-RS is indicated at the end of the arrow.

FIG. 11 is a diagram illustrating the generation of a sequence of PDCH DM-RS. When applying the definitions for a sequence of PDCH DM-RS as the definitions for a sequence of PSCCH DM-RS, the following changes or updates may be applied.

($n_{ID}$)

(1) The value of $n_{ID}$ included in the expression to generate a sequence of PSCCH DM-RS may be defined as a definition in the technical specifications. For example, $n_{ID}$ may be one of the values in $\{0, 1, \ldots, 65535\}$. Alternatively, the value of $n_{ID}$ may vary depending on the cast type (e.g., broadcast/group cast/unicast).

(2) The value of $n_{ID}$ may be determined depending on the ID of a transmission-side user apparatus (TX-UE) or the ID of a reception-side user apparatus (RX-UE) (e.g., $n_{ID}$=TX-UE ID mod $2^{16}$). The ID of a TX-UE may be referred to as a Source ID, Group ID, or Group Source ID, and the ID of an RX-UE may be referred to as a Destination ID, Group ID, or Group Destination ID.

(3) The value of $n_{ID}$ may be configured (in advance). For example, one of the values in $\{0, 1, \ldots, 65535\}$ may be configured by a parameter different from parameters for PDCH DM-RS.

(4) The value of $n_{ID}$ may be provided as a parameter of PC5-RRC to be transmitted and received between user apparatuses.

(5) The value of $n_{ID}$ may be determined by combining (1) (2) (3) (4) described above. For example, the above-described (1) may be applied before a PC5-RRC connection setup, and the above-described (4) may be applied after the PC5-RRC connection setup.

($n^\mu_{s,f}$)

(i) The value of $n^\mu_{s,f}$ included in the expression to generate a DM-RS sequence may be a slot number in a (radio) frame of a sidelink.

(ii) The value of $n^\mu_{s,f}$ may be a slot number in a subframe of the sidelink.

(iii) The value of $n^\mu_{s,f}$ may be a slot number in a Uu (radio) frame or subframe (i.e., in a (radio) frame or subframe between the user apparatus and the base station) (see Uu-based SL scheduling in FIG. 1).

(iv) The value of $n^\mu_{s,f}$ may be determined based on an SFN (System frame number) and/or frame number (e.g., DFN (direct frame number)) used in the sidelink.

(v) The value of $n^\mu_{s,f}$ may be determined by combining (i) (ii) (iii) (iv) described above. For example, in the case of a carrier in which only an unlicensed spectrum or SL is configured, the above-described (i) may be applied, and in the case of a carrier in which a licensed spectrum or Uu and SL are mixed, the above-described (iii) may be applied.

In this way, by applying the definitions for a sequence of PDCH DM-RS as the definitions for a sequence of PSCCH DM-RS, it is possible to reduce the complexity of implementation of a user apparatus.

FIG. 12 is a diagram illustrating a mapping of a sequence of DM-RS for PDCCH. For mapping of a sequence of PSCCH DM-RS onto sidelink physical resources (SL physical resources), the mapping of a sequence of DM-RS for PDCCH may be applied, and the following changes or updates may be applied.

(1) The reference point or control point for the parameter k illustrated in FIG. 12 may be a specific subcarrier in the resource pool (e.g., subcarrier 0 in the resource pool).

(2) The reference point or control point for the parameter k may be a specific subcarrier in a subchannel (e.g., subcarrier 0 (subcarrier 0 in the subchannel)).

(3) The reference point or control point for the parameter k may be a specific subcarrier of the lowest-numbered resource block in actually-utilized resource blocks for a PSCCH (e.g., subcarrier 0 of the lowest-numbered RB in actually-utilized RB for the PSCCH).

(4) The reference point or control point for the parameter k may be a specific subcarrier in the common resource block 0 for the sidelink (e.g., subcarrier 0 in the common resource block 0 for SL).

(PSSCH DM-RS)

As an embodiment according to the present invention, for DM-RS transmitted by a PSSCH (hereafter, referred to as PSSCH DM-RS), it is possible to consider a sequence of PSSCH DM-RS as a sequence corresponding to the sequence of DM-RS of a PDSCH (Physical Downlink Shared Channel) or PUSCH (Physical Uplink Shared Channel). In other words, it is possible to consider applying definitions similar to the definitions for a sequence of DM-RS of PDSCH or PUSCH as the definitions for a sequence of PSSCH DM-RS.

FIG. 13 is a diagram illustrating generation of a sequence of PDSCH DM-RS. When applying the definitions for a sequence of PDSCH DM-RS as the definitions for a sequence of PSSCH DM-RS, the following changes or updates may be applied.

($n_{SCID}$)
- (a) The value of $n_{SCID}$ in the expression to generate a sequence of PSSCH DM-RS may be defined as 0 or 1 in the definitions.
- (b) The value of $n_{SCID}$ may be configured (in advance).
- (c) The value of $n_{SCID}$ may be indicated by SCI and/or DCI.
- (d) The value of $n_{SCID}$ may be determined depending on the resource allocation mode (resource transmission mode).

Note that except for the case of (c) described above, the value of $n_{SCID}$ is determined without indication by the DM-RS sequence initialization field in a DCI format to schedule the sidelink.

($N^{nSCID}_{ID}$)
- (1) The value of $N^{nSCID}_{ID}$ included in the expression to generate a sequence of PSSCH DM-RS may be specified in the definitions. For example, $N^{nSCID}_{ID}$ may be one of the values in {0, 1, . . . , 65535}. Alternatively, the value of $N^{nSCID}_{ID}$ may a value that varies depending on the cast type (e.g., broadcast/group cast/unicast).
- (2) The value of $N^{nSCID}_{ID}$ may be determined depending on the ID of a transmission-side user apparatus (TX-UE) or the ID of a reception-side user apparatus (RX-UE) (e.g., $N^{nSCID}_{ID}$=TX-UE ID mod $2^{16}$). The ID of a TX-UE may be referred to as a Source ID, Group ID, or Group Source ID, and the ID of an RX-UE may be referred to as a Destination ID, Group ID, or Group Destination ID.
- (3) The value of $N^{nSCID}_{ID}$ may be configured (in advance). For example, one of the values in {0, 1, . . . , 65535} may be configured by a parameter different from the parameters for PDSCH.
- (4) The value of $N^{nSCID}_{ID}$ may be provided as a parameter of PC5-RRC to be transmitted and received between the user apparatuses.
- (5) The value of $N^{nSCID}_{ID}$ may be derived from information on a PSCCH. For example, it may be derived from a CRC (CRC scrambling PSCCH) that scrambles the PSCCH. For example, it may be derived from the HPN (also referred to as HARQ Process Number or HARQ Process ID), NDI (New Data Indicator), RV (Reduction Version), frequency-domain resources, MCS (Modulation Coding Scheme), and the like.
- (6) The value of $N^{nSCID}_{ID}$ may be determined by combining (1), (2), (3), (4), and (5) described above. For example, the above-described (1) may be applied before a PC5-RRC connection setup, and the above-described (4) may be applied after the PC5-RRC connection setup.

($n^{\mu}_{s,f}$)
- (i) The value of $n^{\mu}_{s,f}$ included in the expression to generate a sequence of PSSCH DM-RS may be a slot number in a (radio) frame of the sidelink.
- (ii) The value of $n^{\mu}_{s,f}$ may be a slot number in a subframe of the sidelink.
- (iii) The value of $n^{\mu}_{s,f}$ may be a slot number in a Uu (radio) frame or subframe (i.e., in a (radio) frame or subframe between the user apparatus and the base station) (see Uu-based SL scheduling in FIG. 1).
- (iv) The value of $n^{\mu}_{s,f}$ may be determined based on an SFN (System frame number) and/or frame number (e.g., DFN (direct frame number)) used in the sidelink.
- (v) The value of $n^{\mu}_{s,f}$ may be determined by combining (i) (ii) (iii) (iv) described above. For example, in the case of a carrier in which only an unlicensed spectrum or SL is configured, the above-described (i) may be applied, and in the case of a carrier in which a licensed spectrum or Uu and SL are mixed, the above-described (iii) may be applied.

In this way, by applying definitions similar to the definitions for a sequence of DM-RS of a PDSCH or PUSCH as the definitions for a sequence of PSSCH DM-RS, it is possible to reduce the complexity of implementation of a user apparatus.

FIG. 14 is a diagram illustrating a mapping of a sequence of DM-RS for PDSCH. FIG. 15 is a table illustrating parameters for configuring DM-RS for PDSCH. For mapping of a sequence PSSCH DM-RS onto sidelink physical resources (SL physical resources), a sequence mapping of DM-RS for PDSCH/PUSCH may be applied, and the following changes or updates may be applied.

Different definitions may be applied to position configurations (sets) of PSSCH DM-RS, in the case of a slot in which a PSFCH is configured (configurable), and in the case of a slot in which no PSFCH is configured (not configurable).

- (1) The reference point or control point for the parameter k illustrated in FIG. 14 may be a specific subcarrier in the resource pool (e.g., subcarrier 0 in the resource pool).
- (2) The reference point or control point for the parameter k may be a specific subcarrier in a subchannel (e.g., subcarrier 0 (subcarrier 0 in the subchannel)).
- (3) The reference point or control point for the parameter k may be a specific subcarrier of the lowest-numbered resource block in actually-utilized resource blocks for a PSSCH (e.g., subcarrier 0 of the lowest-numbered RB in actually-utilized RB for the PSCCH).
- (4) The reference point or control point for the parameter k may be a specific subcarrier in the common resource block 0 for the sidelink (e.g., subcarrier 0 in the common resource block 0 for SL).

For the position configurations (sets) of PSSCH DM-RS, only configurations for p=1000 and p=1001 in FIG. 15 may be set as available. In other words, as the cdm-Type, TD-CDM (Time Division-Code Division Multiplexing) (OCC (Orthogonal Cover Code)) is not required to be applied. In other words, it may be wt(l')=+1. FD-CDM (Frequency Division-Code Division Multiplexing) (OCC) may be applied, and two DM-RS ports may be multiplexed.

Alternatively, as the position configurations of PSSCH DM-RS, only configurations for p=1000 and p=1002 in FIG. 15 may be set as available. In other words, as the cdm-Type, TD-CDM and FD-CDM may not be applied. In other words, it may be wt(l')=+1 and wf(k')=+1. In this case, two DM-RS ports may be multiplexed by FDM.

Note that in the drawings of the present description, descriptions of the following items are omitted for the sake of convenience of explanation. In practice, at least one of the following items may be included or need not be included.

(1) Transmission/reception switching gap (TS/RX switching gap)
(2) AGC(Automatic Gain Control)
(3) Preamble
(4) Discovery
(5) PSFCH
(6) SL-SSB(Synchronization Signal Block)

(Apparatus Configuration)

Next, an example of a functional configuration of the base station apparatus 10 and the user apparatus 20 to execute the processes and operations described above will be described. The base station apparatus 10 and the user apparatus 20 include the functions of implementing the application examples described above. However, each of the base station apparatus 10 and the user apparatus 20 may include only a subset of the functions of the application examples.

<Base Station Apparatus 10>

Figure 16:
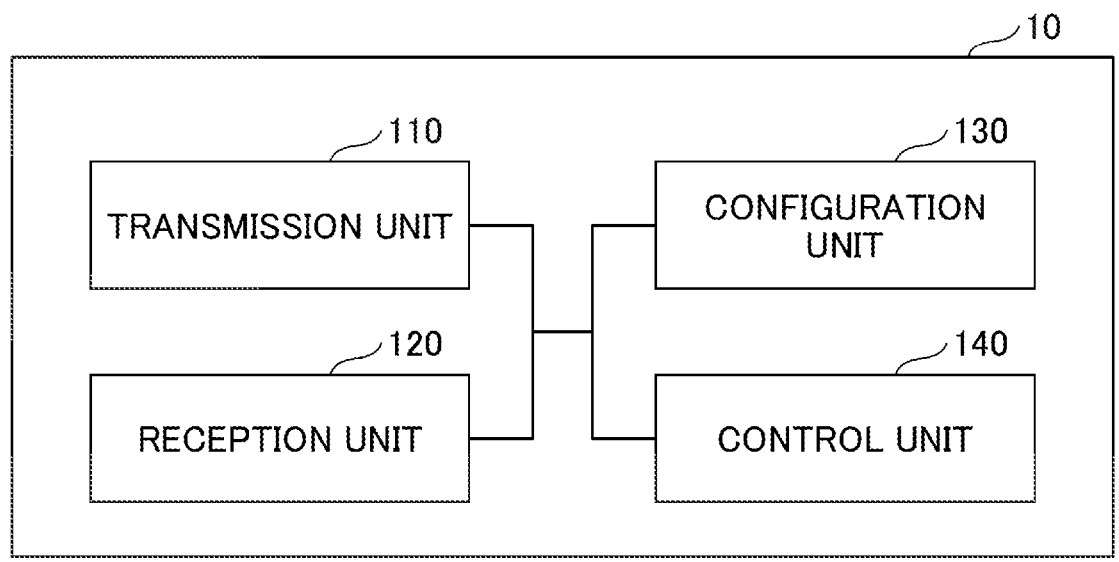
FIG. 16 is a diagram illustrating an example of a functional configuration of a base station apparatus 10 according to an embodiment.

FIG. 16 is a diagram illustrating an example of a functional configuration of the base station apparatus 10. As illustrated in FIG. 16, the base station apparatus 10 includes a transmission unit 110, a reception unit 120, a configuration unit 130, and a control unit 140. The functional configuration illustrated in FIG. 16 is merely an example. Functional partitioning and names of the functional units may be any name as long as operations can be executed according to the embodiments of the present invention.

The transmission unit 110 includes a function of generating a signal to be transmitted to the user apparatus 20 and transmitting the signal wirelessly. Also, the transmission unit 110 transmits information on SL scheduling and the like, to the user apparatus 20. The reception unit 120 includes a function of receiving various signals transmitted from the user apparatus 20 and obtaining information on a higher layer, for example, from the received signal.

The configuration unit 130 stores configuration information set in advance and various items of configuration information to be transmitted to the user apparatus 20 in a memory device and reads out the configuration information from the memory device as needed. The contents of the configuration information include, for example, information related to a configuration of V2X and the like.

As described in the application examples, the control unit 140 performs processing related to a configuration for the user apparatus 20 to perform V2X. Also, a functional unit for transmitting signals in the control unit 140 may be included in the transmission unit 110, and a functional unit for receiving signals in the control unit 140 may be included in the reception unit 120.

<User Apparatus 20>

Figure 17:
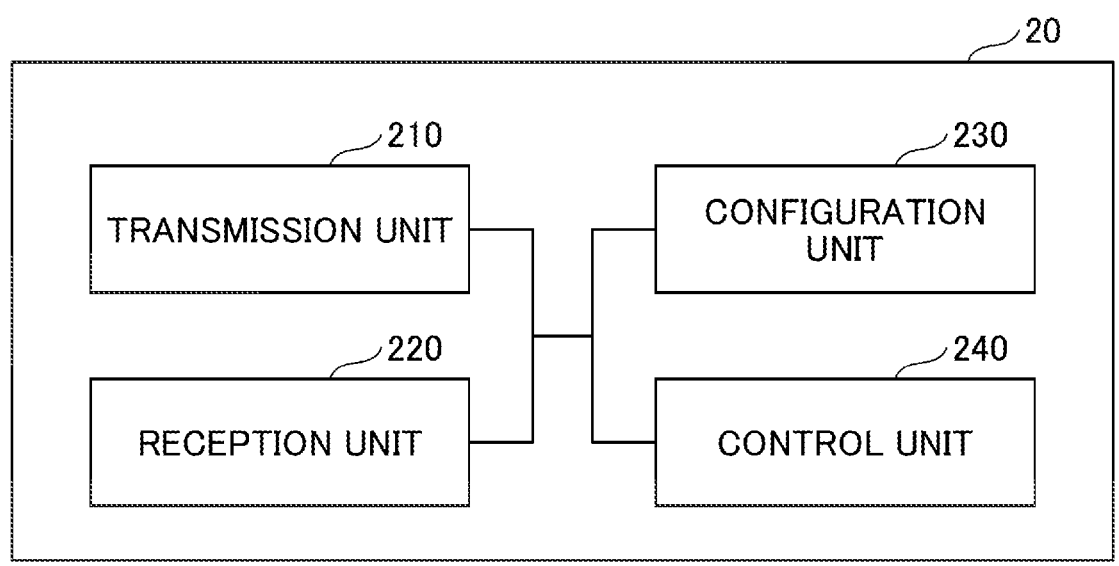
FIG. 17 is a diagram illustrating an example of a functional configuration of a user apparatus 20 according to an embodiment.

FIG. 17 is a diagram illustrating an example of a functional configuration of the user apparatus 20. As illustrated in FIG. 17, the user apparatus 20 includes a transmission unit 210, a reception unit 220, a configuration unit 230, and a control unit 240. The functional configuration illustrated in FIG. 17 is merely an example. Functional partitioning and names of the functional units may be determined discretionarily as long as operations can be executed according to the embodiments of the present invention.

The transmission unit 210 generates a transmission signal from transmission data, to transmit the transmission signal wirelessly. The reception unit 220 receives various signals wirelessly and obtains a signal of a higher layer from a received signal on the physical layer. The transmission unit 210 transmits CSI-RS and DM-RS of the sidelink to the other user apparatuses 20. The reception unit 220 has a function of receiving SL scheduling transmitted from the base station apparatus 10. The reception unit 220 receives CSI-RS and DM-RS of the sidelink from the other user apparatuses 20.

The configuration unit 230 stores various items of configuration information received by the reception unit 220 from the base station apparatus 10 or the user apparatus 20 in a memory device, and reads out the configuration information from the memory device as needed. The configuration unit 230 also stores configuration information set in advance. The contents of the configuration information include, for example, information related to CSI-RS and DM-RS of a sidelink and the like.

The control unit 240 controls D2D communication executed with the other user apparatuses 20 as described in the application examples. Also, the control unit 240 performs a radio access procedure with the other user apparatuses 20. A functional unit for transmitting signals in the control unit 240 may be included in the transmission unit 210, and a functional unit for receiving signals in the control unit 240 may be included in the reception unit 220.

(Hardware Configuration)

The functional configuration diagrams (FIGS. 16 and 17) used for describing the above-described embodiments of the present invention show blocks in functional units. These functional blocks (components) may be implemented by any combination of hardware and/or software. Further, the implementation of the functional blocks is not limited in particular. In other words, each functional block may be implemented by using one device that physically and/or logically couples multiple elements; or two or more devices that are physically and/or logically separated may be connected directly and/or indirectly (e.g., by wire and/or wirelessly) so as to implement the functional block.

Figure 18:
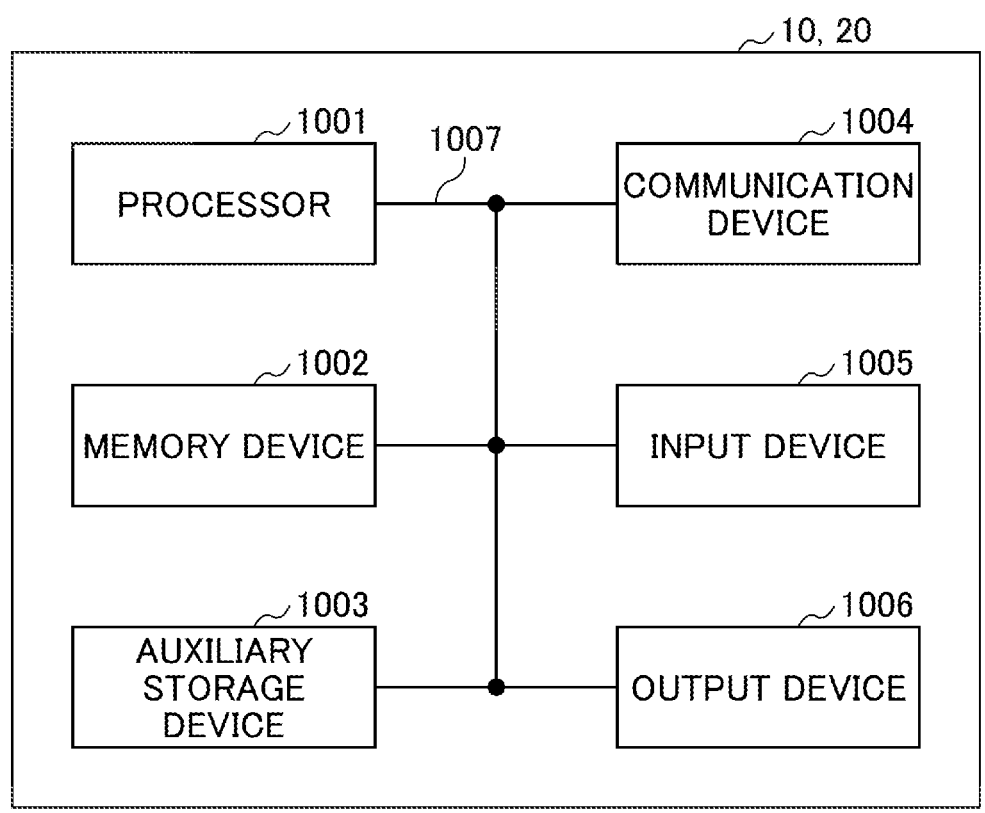
FIG. 18 is a diagram illustrating an example of a hardware configuration of a base station apparatus 10 and a user apparatus 20 according to an embodiment.

Also, for example, both of the base station apparatus 10 and the user apparatus 20 in an embodiment of the present invention may function as computers that perform processing according to the embodiment of the present invention. FIG. 18 is a diagram illustrating an example of a hardware configuration of the base station apparatus 10 or the user apparatus 20 according to an embodiment of the present invention. Each of the base station apparatus 10 and user apparatus 20 described above may be physically configured as a computer device that includes a processor 1001, a memory device 1002, an auxiliary storage device 1003, a communication device 1004, an input device 1005, an output device 1006, and a bus 1007.

Note that in the following description, the term "apparatus" can be read as a circuit, device, unit, or the like. The hardware configuration of the base station apparatus 10 and the user apparatus 20 may be configured to include one or more of the devices denoted as 1001 to 1006 in the drawings or may be configured without including some of the devices.

Each function in the base station apparatus 10 and the user apparatus 20 is implemented by loading predetermined software (a program) on the hardware such as the processor 1001 and the memory device 1002 so as to cause the processor 1001 to execute operations, to control communication by the communication device 1004, and to control reading and/or writing data in the memory device 1002 and the auxiliary storage device 1003.

The processor 1001 controls the entire computer, for example, by causing an operating system to run. The processor 1001 may be constituted with a central processing unit (CPU) that includes interfaces with peripheral devices, a control unit, an arithmetic/logic unit, registers, and the like.

The processor 1001 also reads a program (a program code), a software module, data, and the like from the auxiliary storage device 1003 and/or the communication device 1004 to the memory device 1002 to perform various processes in accordance with these. As a program, a program that causes the computer to execute at least some of the operations described in the above-described embodiments is used. For example, the transmission unit 110, the reception unit 120, the configuration unit 130, and the control unit 140 of the base station apparatus 10 illustrated in FIG. 16 may be implemented by a control program that is stored in the memory device 1002 and runs on the processor 1001. Also, for example, the transmission unit 210, the reception unit 220, the configuration unit 230, and the control unit 240 of the user apparatus 20 illustrated in FIG. 17 may be implemented by a control program that is stored in the memory device 1002 and runs on the processor 1001. Although the various processes described above are assumed to be executed by the single processor 1001, these may be executed simultaneously or sequentially by two or more processors 1001. The processor 1001 may be implemented by one or more chips. Note that the program may be transmitted from a network via a telecommunication line.

The memory device 1002 is a computer-readable recording medium, and may be constituted with, for example, at least one of a ROM (Read-Only Memory), an EPROM (Erasable Programmable ROM), an EEPROM (Electrically Erasable Programmable ROM), a RAM (Random Access Memory), and the like. The memory device 1002 may be referred to as a register, a cache, a main memory (a main memory device), or the like. The memory device 1002 is capable of storing a program (a program code), a software module, and the like that are executable to implement processing according to an embodiment of the present invention.

The auxiliary storage device 1003 is a computer-readable recording medium and may be constituted with, for example, at least one of an optical disk such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, and a key drive), a floppy (registered trademark) disk, a magnetic strip, and the like. The auxiliary storage device 1003 may be referred to as an auxiliary storage device. The recording medium described above may be, for example, a database, a server, or any other suitable medium that includes the memory device 1002 and/or the auxiliary storage device 1003.

The communication device 1004 is hardware (a transceiver device) for communicating with computers via a wired network and/or a wireless network, and is also referred to as, for example, a network device, a network controller, a network card, a communication module, and the like. For example, the transmission unit 110 and the reception unit 120 of the base station apparatus 10 may be implemented by the communication device 1004. Also, the transmission unit 210 and the reception unit 220 of the user apparatus 20 may be implemented by the communication device 1004.

The input device 1005 is an input device (e.g., a keyboard, a mouse, a microphone, a switch, a button, a sensor, etc.) to receive input from the outside. The output device 1006 is an output device (e.g., a display, a speaker, an LED lamp, etc.) to execute outputting to the outside. Note that the input device 1005 and the output device 1006 may have an integrated configuration (e.g., a touch panel).

Each of the devices such as the processor 1001 and the memory device 1002 is connected via the bus 1007 for communicating information. The bus 1007 may be configured by using a single bus or may be configured by using different buses between specific devices.

Each of the base station apparatus 10 and the user apparatus 20 may also be configured to include hardware such as a microprocessor, a digital signal processor (DSP), an ASIC (Application Specified Circuit), a PLD (Programmable Logic Device), and an FPGA (Field Programmable Gate Array), and with such hardware, some of or all of the functional blocks may be implemented. For example, the processor 1001 may be implemented by at least one of these hardware components.

Summary of Embodiments

As described above, according to the embodiments of the present invention, a terminal is provided that includes: a control unit configured to generate a sequence that corresponds to a sequence of a reference signal between a base station and a terminal; and a transmission unit configured to transmit a reference signal having the generated sequence to another terminal.

The configurations described above provide technologies that specify reference signals in a sidelink of NR (NR-SL).

Supplement to Embodiments

As above, the embodiment of the present invention has been described; note that the disclosed invention is not limited to the embodiments, and those skilled in the art would understand various modifications, revisions, alternatives, substitutions, and the like. Although the description has been made by using specific numerical examples to facilitate understanding of the invention, unless otherwise stated, these values are merely examples and any suitable values may be used. Partitioning of the items in the above-described description is not essential to the present invention, and matters described in two or more items may be used in combination as needed, or a matter described in one item may be applied to another matter described in another item (as long as no inconsistency is introduced). The boundaries of functional units or processing units in the functional block diagrams do not necessarily correspond to the physical boundaries of parts. The operations of the multiple functional units may be performed on a single physical part, or the operation of one functional unit may be performed on multiple physical parts. As for the processing steps described in the embodiments, the order of steps may be exchanged as long as no inconsistency is introduced. Although for the sake of convenience of describing processes, the base station apparatus 10 and the user apparatus 20 have been described by using the functional block diagrams, these apparatuses may be implemented by hardware, software, or a combination of these. The software executed by the processor included in the base station apparatus 10 according to the embodiment of the present invention, and the software executed by the processor included in the user apparatus 20 according to the embodiment of the present invention, may be stored, respectively, in a random access memory (RAM), a flash memory, a read-only memory (ROM), an EPROM, an EEPROM, a register, a hard disk (HDD), a removable disk, a CD-ROM, a database, a server, or any other suitable recording medium.

Indication of information is not limited to the aspects and the embodiments described in the present description, and may be done by using other methods. For example, indication of information may be performed by physical layer signaling (e.g., DCI (Downlink Control Information), UCI (Uplink Control Information)), higher-layer signaling (e.g., RRC (Radio Resource Control) signaling, MAC (Medium Access Control) signaling, broadcast information (MIB (Master Information Block), SIB (System Information Block)), other signals, or a combination of these. Also, RRC signaling may also be referred to as an RRC message, and may also be, for example, an RRC connection setup message, an RRC connection reconfiguration message, or the like.

The aspects and the embodiments described in the present disclosure may be applied to systems utilizing LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other suitable systems; and/or next-generation systems extended based on these systems.

The processing steps, sequences, flowcharts, and the like of the aspects and the embodiments described in the present description may be reordered as long as no inconsistency is introduced. For example, a method described in the present description presents elements of various steps as an exemplary order, and is not limited to the particular order presented.

A specific operation described in the present description to be performed by the base station apparatus 10 may be performed by its upper node, depending on circumstances. In a network constituted with one or more network nodes having the base station apparatus 10, it is apparent that various operations performed for communication with the user apparatuses 20 may be performed by the base station apparatus 10 and/or other network nodes (for example, an MME or an S-GW may be considered, but not limited to these) other than the base station apparatus 10. In the above-described description, although a case has been exemplified in which there is a single network node other than the base station apparatus 10, the case may be exemplified as a combination of multiple other network nodes (e.g., MME and S-GW).

Each of the aspects and embodiments described in the present Description may be used singly, in combination, or switched over upon execution.

The user apparatus 20 may be referred to by an ordinary skilled person in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term.

The base station apparatus 10 may be referred to as an NB (NodeB), eNB (evolved NodeB), gNB, base station, or any other proper term, by those of ordinary skill in the art.

The terms "determination (or determining)" and "decision (or determining)" used in the present description may encompass a wide variety of operations. For example, "determination" and "decision" may include "determination" and "decision" made with judging, calculating, computing, processing, deriving, investigating, searching (looking up, search, inquiry) (e.g., search in a table, a database, or another data structure), or ascertaining. Also, "determination" and "decision" may include "determination" and "decision" made with, for example, receiving (e.g., receiving information), transmitting (e.g., transmitting information), input, output, or accessing (e.g., accessing data in a memory). Also, "determination" and "decision" may include "determination" and "decision" made with resolving, selecting, choosing, establishing, or comparing. In other words, "determination" and "decision" may include "determination" and "decision" made with a certain action.

A description using "based on" in the present description does not mean "based only on" unless otherwise specified. In other words, "based on" means both "based only on" and "based at least on".

As long as the terms "include", "including", and variations of these are used in the present description and the claims, it is intended that these terms are as comprehensive as the term "comprising". Further, it is intended that the term "or" used in the present description and the claims is not an exclusive OR.

In the entire present description, in the case where an article, for example, "a", "an", or "the" in English, is added by translation, these articles may include a plural form of the noun unless otherwise clarified in the context.

As above, the present invention has been described in detail; note that it is apparent to those skilled in the art that the present invention is not limited to the particulars of the described embodiments. The present invention may be implemented as a modified and changed aspect without deviating from the purpose and scope of the present invention defined by the appended claims. Accordingly, descriptions in the present description are intended for illustrative purposes and should be construed as restricting the scope of the present invention.

DESCRIPTION OF REFERENCE SIGNS 10 base station apparatus
110 transmission unit
120 reception unit
130 configuration unit
140 control unit
20 user apparatus
210 transmission unit
220 reception unit
230 configuration unit
240 control unit
1001 processor
1002 memory device
1003 auxiliary storage device
1004 communication device
1005 input device
1006 output device

The invention claimed is:
1. A terminal comprising:
a control unit configured to:
generate a sequence of a reference signal of a sidelink control channel by using a slot number in a frame and an ID number provided by a higher layer parameter, and
generate a sequence of a reference signal of a sidelink data channel by using the slot number in the frame and an ID number calculated using a value of Cyclic Redundancy Check (CRC) of the sidelink control channel;
a transmission unit configured to transmit the reference signal of the sidelink control channel and the reference signal of the sidelink data channel to another terminal; and a configuration unit configured to cause a port number used for transmitting the reference signal of the sidelink data channel to be only 1000 and 1001.

2. The terminal as claimed in claim 1, wherein the control unit applies a frequency domain orthogonal cover code to the reference signal of the sidelink data channel, and does not apply a time domain orthogonal cover code.

3. A communication method of a terminal, the method comprising:
  generating a sequence of a reference signal of a sidelink control channel by using a slot number in a frame and an ID number provided by a higher layer parameter;
  generating a sequence of a reference signal of a sidelink data channel by using the slot number in the frame and an ID number calculated using a value of Cyclic Redundancy Check (CRC) of the sidelink control channel;
  transmitting the reference signal of the sidelink control channel and the reference signal of the sidelink data channel to another terminal; and
  causing a port number used for transmitting the reference signal of the sidelink data channel to be only 1000 and 1001.

4. A communication system comprising: a first terminal; and a second terminal, wherein
the first terminal includes:
  a control unit configured to:
    generate a sequence of a reference signal of a sidelink control channel by using a slot number in a frame and an ID number provided by a higher layer parameter, and
    generate a sequence of a reference signal of a sidelink data channel by using the slot number in the frame and an ID number calculated using a value of Cyclic Redundancy Check (CRC) of the sidelink control channel;
  a configuration unit configured to:
    configure a port to be used for transmitting the reference signal of the sidelink data channel, and
    cause a port number used for transmitting the reference signal of the sidelink data channel to be only 1000 and 1001; and
  a transmission unit configured to transmit the reference signal of the sidelink control channel and the reference signal of the sidelink data channel to the second terminal, and
the second terminal includes:
  a reception unit configured to receive the reference signal of the sidelink control channel and the reference signal of the sidelink data channel from the first terminal.

* * * * *